(12) United States Patent
Collyer et al.

(10) Patent No.: US 7,374,134 B2
(45) Date of Patent: May 20, 2008

(54) SYSTEMS AND METHODS FOR SEMI-PERMANENT, NON-PRECISION INSPACE ASSEMBLY OF SPACE STRUCTURES, MODULES AND SPACECRAFT

(75) Inventors: Gordon L. Collyer, Clearwater, FL (US); Jeremy Ramos, Clearwater, FL (US); Jason Waltuch, St. Petersburg, FL (US); Christopher J. Butera, Odessa, FL (US)

(73) Assignee: Honeywell International Inc., Morristown, NJ (US)

( * ) Notice: Subject to any disclaimer, the term of this patent is extended or adjusted under 35 U.S.C. 154(b) by 132 days.

(21) Appl. No.: 11/215,570

(22) Filed: Aug. 29, 2005

(65) Prior Publication Data

US 2007/0045475 A1 Mar. 1, 2007

(51) Int. Cl.
*B64G 1/64* (2006.01)
*B23K 13/06* (2006.01)

(52) U.S. Cl. ..................... 244/172.4; 219/72

(58) Field of Classification Search ............ 244/159.4, 244/172.4, 172.5; 219/72, 101–107, 137 R; 228/119, 220
See application file for complete search history.

(56) References Cited

U.S. PATENT DOCUMENTS

| | | | | |
|---|---|---|---|---|
| 3,758,741 A | * | 9/1973 | Holko et al. | ............. 219/78.02 |
| 3,914,063 A | * | 10/1975 | Papayoti | ............. 403/217 |
| 4,256,947 A | * | 3/1981 | De Candia | ............. 219/79 |
| 4,607,815 A | * | 8/1986 | Turci et al. | ............. 244/172.4 |
| 4,660,753 A | * | 4/1987 | Kushibe et al. | ............. 228/48 |
| H1378 H | * | 11/1994 | Crane et al. | ............. 414/737 |
| 5,364,046 A | * | 11/1994 | Dobbs et al. | ............. 244/172.4 |
| 5,429,328 A | * | 7/1995 | Dobbs et al. | ............. 244/172.5 |
| 5,511,748 A | * | 4/1996 | Scott | ............. 244/172.5 |
| 5,841,071 A | * | 11/1998 | La Roche et al. | ............. 174/94 R |
| 5,931,959 A | | 8/1999 | Kwiat | |
| 6,104,211 A | | 8/2000 | Alfke | |
| 6,263,466 B1 | | 7/2001 | Hinedi et al. | |
| 6,275,751 B1 | * | 8/2001 | Stallard et al. | ............. 701/13 |
| 6,299,107 B1 | * | 10/2001 | Kong et al. | ............. 244/172.4 |
| 6,317,367 B1 | | 11/2001 | Sample et al. | |
| 6,354,540 B1 | * | 3/2002 | Lewis et al. | ............. 244/172.4 |
| 6,585,442 B2 | * | 7/2003 | Brei et al. | ............. 403/13 |
| 6,662,302 B1 | | 12/2003 | Garey | |
| 6,742,745 B2 | * | 6/2004 | Tchoryk et al. | ............. 244/172.4 |
| 6,838,899 B2 | | 1/2005 | Plants | |
| 6,866,232 B1 | * | 3/2005 | Finney | ............. 244/172.4 |
| 6,996,443 B2 | | 2/2006 | Marshall et al. | |

(Continued)

OTHER PUBLICATIONS

"The Welding Processes: Resistance Welding" www.Key-to-Steel.com, Aug. 10, 2004 http://web.archive.org/web/20040810000238/www.key-to-steel.com/ViewArticle.asp?ID=76.*

(Continued)

*Primary Examiner*—Teri Pham Luu
*Assistant Examiner*—Joseph W Sanderson

(57) ABSTRACT

Methods and systems for assembling spacecraft in space are provided. A modular spacecraft comprises a plurality of spacecraft modules, wherein each spacecraft module includes one or more of bonding posts and receiving plates mounted to an exterior surface each spacecraft module, wherein the one or more bonding posts and receiving plates are adapted to form one or more of, an electro-weld bond and an adhesive bond, with the one or more receiving plates.

4 Claims, 12 Drawing Sheets

U.S. PATENT DOCUMENTS

| | | |
|---|---|---|
| 7,036,059 B1 | 4/2006 | Carmichael et al. |
| 7,058,177 B1 | 6/2006 | Trimberger et al. |
| 2002/0134543 A1* | 9/2002 | Estes et al. ................. 165/277 |
| 2004/0231790 A1* | 11/2004 | Hou et al. ................ 156/307.1 |
| 2005/0263649 A1* | 12/2005 | Ritter et al. ............. 244/172.4 |
| 2006/0272538 A1* | 12/2006 | Janik et al. ................. 102/473 |

OTHER PUBLICATIONS

"Resistance Wleding" American Metallurgical Consultants, Aug. 12, 2004 http://web.archive.org/web/20040812081404/http://www.weldingengineer.com/1+Resistance.htm☐☐.*

* cited by examiner

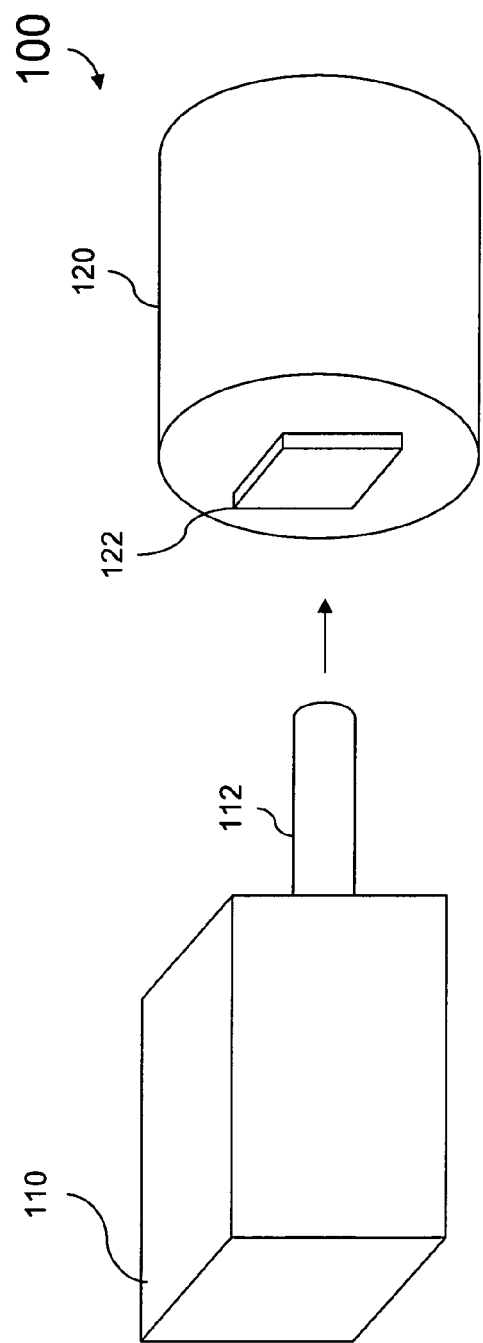
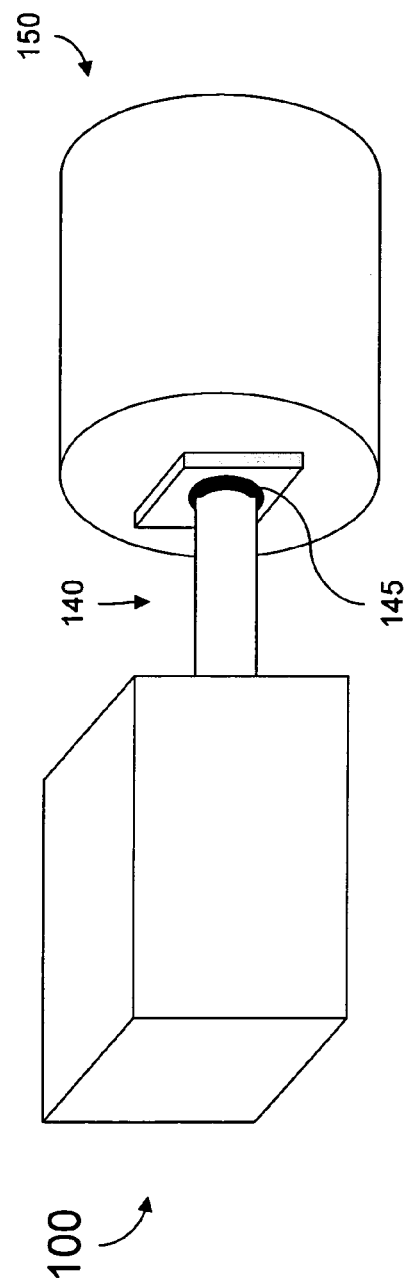
Fig. 1A
Fig. 1B

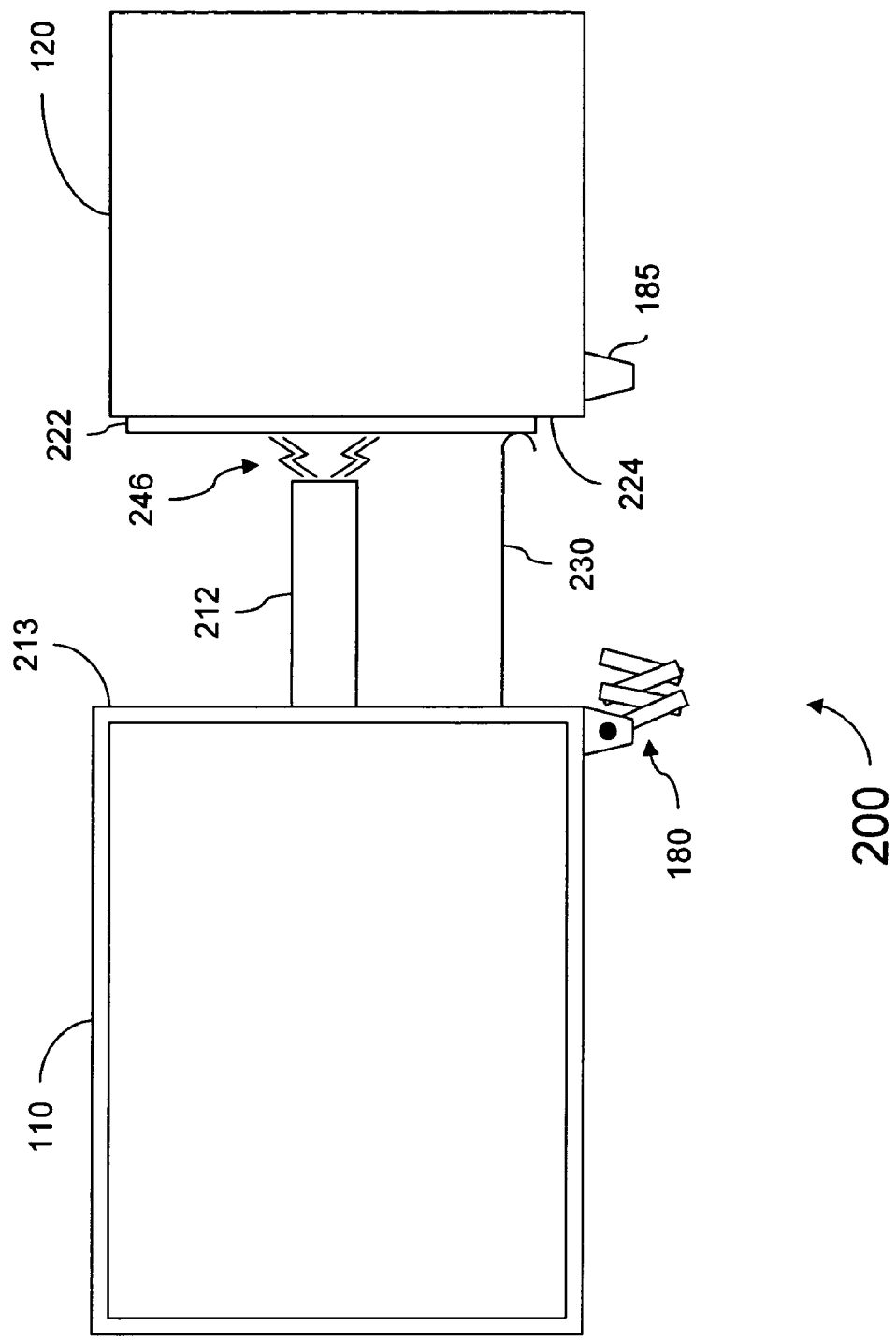

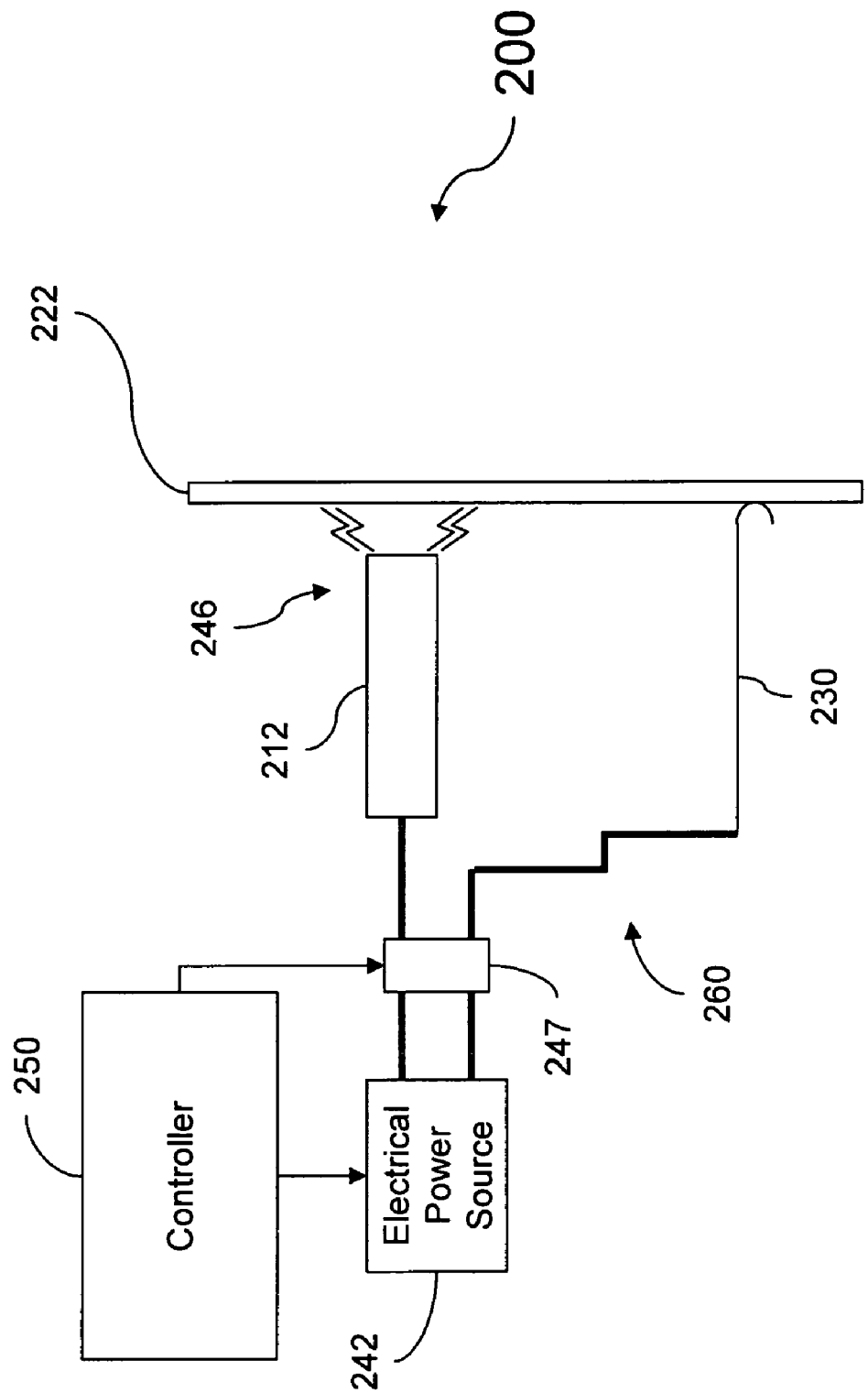

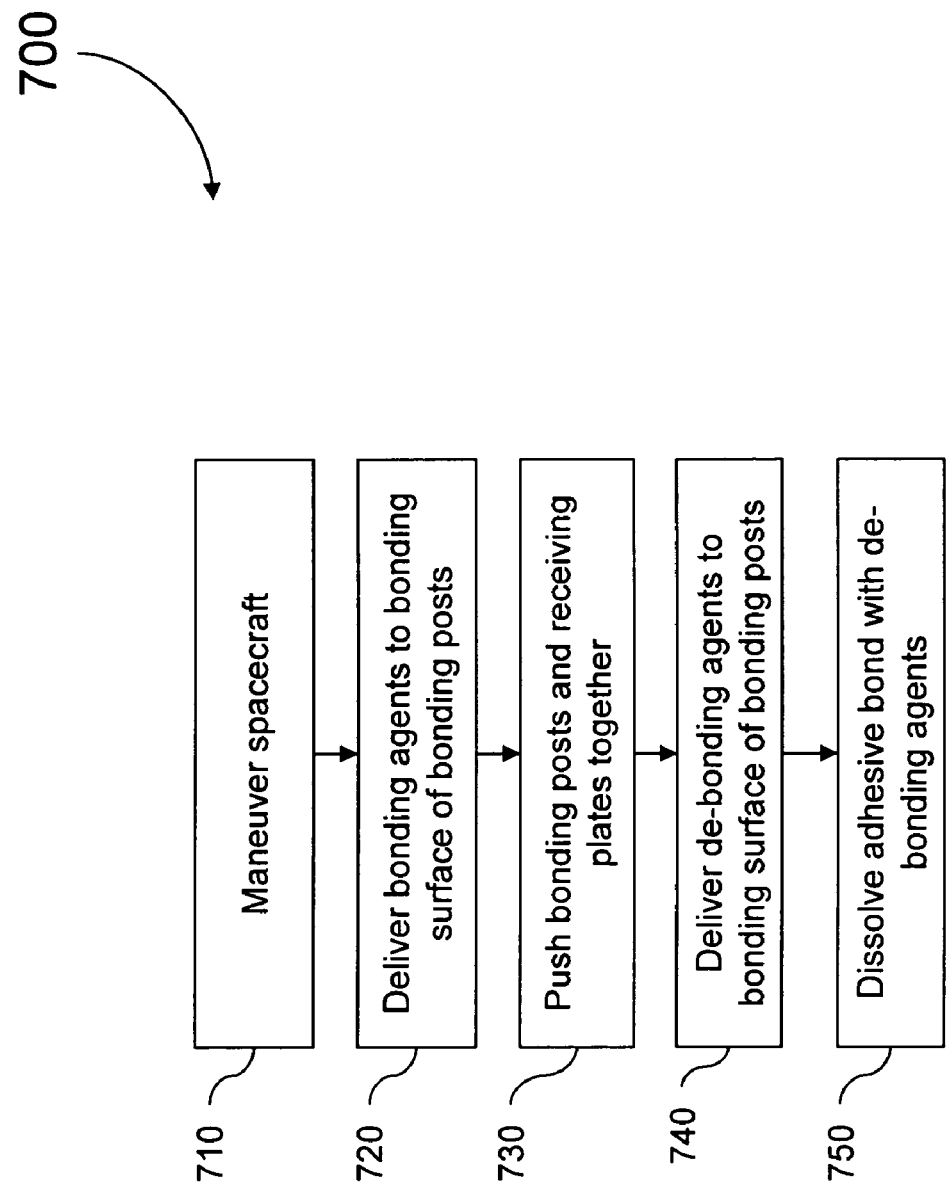

SYSTEMS AND METHODS FOR SEMI-PERMANENT, NON-PRECISION INSPACE ASSEMBLY OF SPACE STRUCTURES, MODULES AND SPACECRAFT

CROSSREFERENCES

This application is related to the following co-pending United States patent application filed on even date herewith, which is hereby incorporated herein by reference:

U.S. patent application Ser. No. 11/215,571 (entitled "Systems and Methods for Processing Digital Video Data") and which is referred to here as the '6851 Application.

TECHNICAL FIELD

The present invention generally relates to spacecraft and more specifically to assembling structures in space.

BACKGROUND

Current and future space initiatives for orbiting space stations and interplanetary vehicles include modular spacecraft designs where a larger structure is assembled in space from a plurality of smaller modules launched separately. Modular designs reduce the cost of realizing large spacecraft because correspondingly large launch vehicles are not required to get the smaller modules into space. However, these designs are currently limited by the relatively complex docking mechanisms currently required to secure smaller modules together. Most docking performed today in space assumes that humans maneuver at least one of two spacecraft in a fairly accurate way so that fairly precise docking mechanisms engage to lock the two spacecraft together. Typically, that same docking mechanism also provides for the connection of auxiliary services such as power and fluid transport between the two spacecraft. When multiple modules each require precision maneuvering and mechanisms in order to link up with other modules, the expenses required for precision equipment to accomplish docking partially defeat the advantages provided by modular designs.

For the reasons stated above and for other reasons stated below which will become apparent to those skilled in the art upon reading and understanding the specification, there is a need in the art for cost-effective methods and systems for assembling structures in space.

SUMMARY

The Embodiments of the present invention provide methods and systems for assembling structures in space and will be understood by reading and studying the following specification.

In one embodiment, a method for assembling two or more spacecraft modules together though one or more electro-weld bonds is provided. The method comprises maneuvering one or both of a first spacecraft module and a second spacecraft module so that one or more bonding posts are in close proximity to one or more receiving plates; electrically energizing the one or more bonding posts and one or more receiving plates; adjusting current flow to create molten metal between the one or more bonding posts and the one or more receiving plates; and de-energizing the one or more bonding posts and one or more receiving plates when sufficient molten metal is produced.

In another embodiment, a modular spacecraft is provided. The modular spacecraft comprises a plurality of spacecraft modules, wherein each spacecraft module includes one or more of bonding posts and receiving plates mounted to an exterior surface each spacecraft module, wherein the one or more bonding posts and receiving plates are adapted to form one or more of, an electro-weld bond and an adhesive bond, with the one or more receiving plates.

In yet another embodiment, a system for assembling a plurality of spacecraft modules in space is provided. The system comprises means for delivering one or more bonding agents to a bonding surface one or more bonding posts mounted to an exterior surface of a first spacecraft, wherein the one or more bonding agents are adapted to create one or more adhesive bonds between the one or more bonding posts and one or more receiving plates mounted to an exterior surface of a second spacecraft; and means for controlling the flow of the one or more bonding agents to a bonding surface of the one or more bonding posts.

DRAWINGS

The present invention can be more easily understood and further advantages and uses thereof more readily apparent, when considered in view of the description of the embodiments and the following figures in which:

FIGS. 1A and 1B are illustrations of two spacecraft modules mechanically connected by a bonding device of one embodiment of the present invention;

FIGS. 2A, 2B and 2C are illustrations of two spacecraft modules fused together by an electro-weld bond of one embodiment of the present invention;

FIG. 7 is a flow chart illustrating a method of one embodiment of the present invention.

In accordance with common practice, the various described features are not drawn to scale but are drawn to emphasize features relevant to the present invention. Reference characters denote like elements throughout figures and text.

DETAILED DESCRIPTION

Figure 2B:
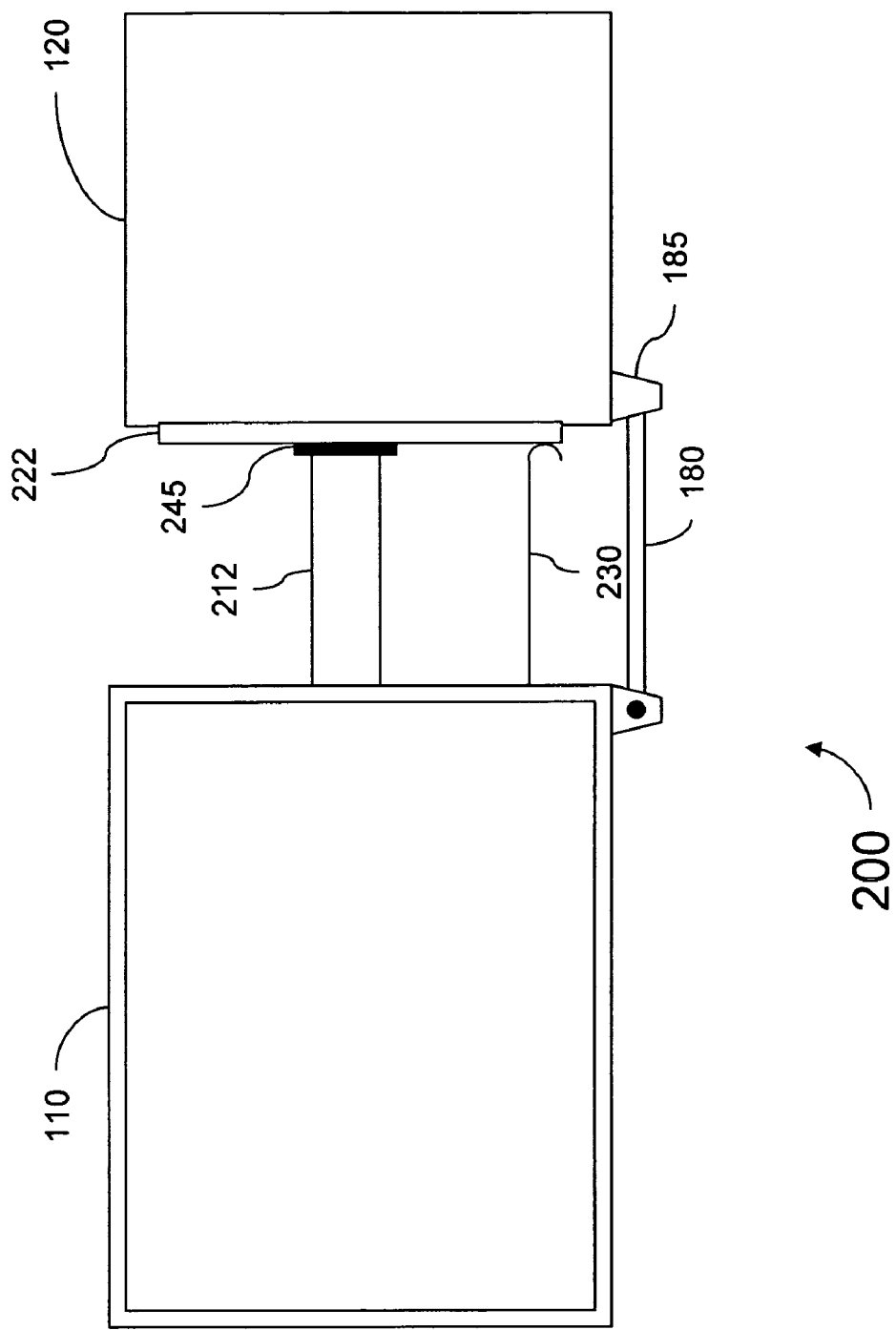

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Embodiments of the present invention provide for the mechanical connection of two or more spacecraft modules in space through one or more bonding processes described in this specification. In one embodiment, individual spacecraft modules contribute specific functions towards the mission of a larger spacecraft. Examples of spacecraft modules include, but are not limited to, propulsion modules, habitat modules, electric power modules, and storage modules. Other types of modules are possible based on the specific needs of the larger spacecraft. Instead of requiring the precision alignment of modules to assemble the larger spacecraft, embodiments of the present invention allow greater leeway in the maneuvering of spacecraft modules. Once the mechanical connection between modules is established, then secondary connection, such as hook ups for power and fluids, may be established. Although secondary connections may require precision movements, one would not need to maneuver the entire spacecraft in order to make the secondary connections. These secondary connections are also more easily completed given an existing structural connection between the two spacecraft modules.

FIGS. 1A and 1B illustrate one embodiment 100 of the present invention. In one embodiment, spacecraft module 110 and spacecraft module 120 (shown separated in FIG. 1A) are assembled together into a single spacecraft assembly 150 (shown in FIG. 1B), wherein spacecraft modules 110 and 120 are secured together by bonding device 140. In one embodiment, bonding device 140 is comprised of two components, a bonding post 112 and a receiving plate 122, mounted to spacecraft module 110 and spacecraft 120, respectively. In space, spacecraft modules 110 and 120 adjust their relative positions so that bonding post 112 is very close to, or in contact with receiving plate 122. Spacecraft modules 110 and 120 are then secured together by a mechanical bond 145. The precision of assembly is arbitrarily dictated by the relative sizes of bonding posts 112 and receiving plate 122, which is another feature of the technique and embodiments of the present invention. As would be appreciated, any number of spacecraft modules can be assembled into a single structure using a plurality of bonds formed in accordance with embodiments of the present invention. Embodiments of techniques for forming bond 145 are described below.

The choice of metals used in fabricating bonding posts 212 and receiving plates 222 are readily determined by one skilled in the art of welding after reading this specification, based on the required strength of the weld. Similarly, the magnitude of electric current required to produce molten metal between bonding posts 212 and receiving plates 222 is also readily determined by one skilled in the art of welding after reading this specification based on the characteristics of metals chosen and the size of the bonding post.

As illustrated in FIG. 2C, in one embodiment, system 200 further comprises a controller 250 adapted to control the flow of electric current through bonding posts 212 and receiving plates 222. In one embodiment, electrical power source 242 is electrically coupled to bonding posts 212 and receiving plates 222 so that an electric circuit 260 is established when bonding posts 212 contact receiving plates 222. In order to complete the return current path from receiving plates 222 to power source 242, in one embodiment, circuit 260 comprises one or more conductors 230, such as a sprung wire or similar type of semi-rigid metallic wire. Conductors 230 are also mounted to the exterior surface 213 of spacecraft module 110 and adapted to make contact with receiving plates 222 when bonding posts 212 contact receiving plates 222. As would be appreciated and readily determined by one skilled in the art upon reading this specification, conductors 230 must be separated by sufficient distance from bonding posts 212 to prevent arcing between bonding posts 212 and conductors 230. Additionally, the surface area of receiving plate 212 must be large enough to accommodate both bonding posts 212 and conductors 230. Accordingly, the precision required for maneuvering the two spacecraft modules together is a function of the surface area of the receiving plates 222. The larger the surface area, the less precision alignment is needed to align both bonding posts 212 and conductors 230 with receiving plates 222. This is because the operators or systems controlling and maneuvering the spacecraft modules have a larger target to aim for. In contrast, in docking mechanisms of the existing art, a docking interface on one spacecraft must precisely align with a docking interface on the second spacecraft.

In one embodiment, controller 250 is adapted to switch on and off the flow of current through circuit 360 via one or more switching devices 247. In one embodiment, controller 250 is adapted to variably control the flow of current in circuit 260. As spacecraft modules 110 and 120 are maneuvered together to bring bonding posts 212 and receiving plates 222 within sufficient proximity, controller 250 closes switching devices 247 and adjusts power source 242 to allow sufficient electrical current to flow through circuit 260 to produce molten metal between bonding posts 212 and receiving plates 222. When enough molten metal is produced (which may, in one embodiment, be determined as a function of current amperage and time), controller 250 cuts off the power to circuit 260, allowing the molten metal to solidify, thus fusing bonding posts 212 and receiving plates 222 together. Once spacecraft modules 110 and 120 are fused together, precision connection of auxiliary service conduits 180, such as but not limited to electric power, data, communications, air, water, other gasses and liquids, between the modules is more easily accomplished. This is because the need to maneuver the position of one spacecraft module relative to the other to make connections between auxiliary service conduits 180 and conduit receivers 185 is eliminated. Because the relative position of the two modules is now fixed, auxiliary service conduits 180 and conduit receivers 185 are more easily aligned for connection.

The low level of precision required to maneuver spacecraft to practice embodiments of the present invention also reduces the need for on board resources, such as high speed computers, high resolution video processing equipment and other secondary sensors necessary to perform a precision alignment. Further, embodiments of the present invention open the door for automated docking systems which are able to assemble larger spacecraft from two or more modules, without human assistance, utilizing less complex computing resources than are required to dock spacecraft today. In one embodiment, controller 250 is adapted to control electrical current flow through circuit 260 based on input from a human operator who determines one or more of when to switch on circuit 260, when to switch off circuit 260, and the current amperage through circuit 260. In another embodiment, controller 250 is adapted to control electric current flow through circuit 260 based on input from an automated docking system.

Figure 5A:
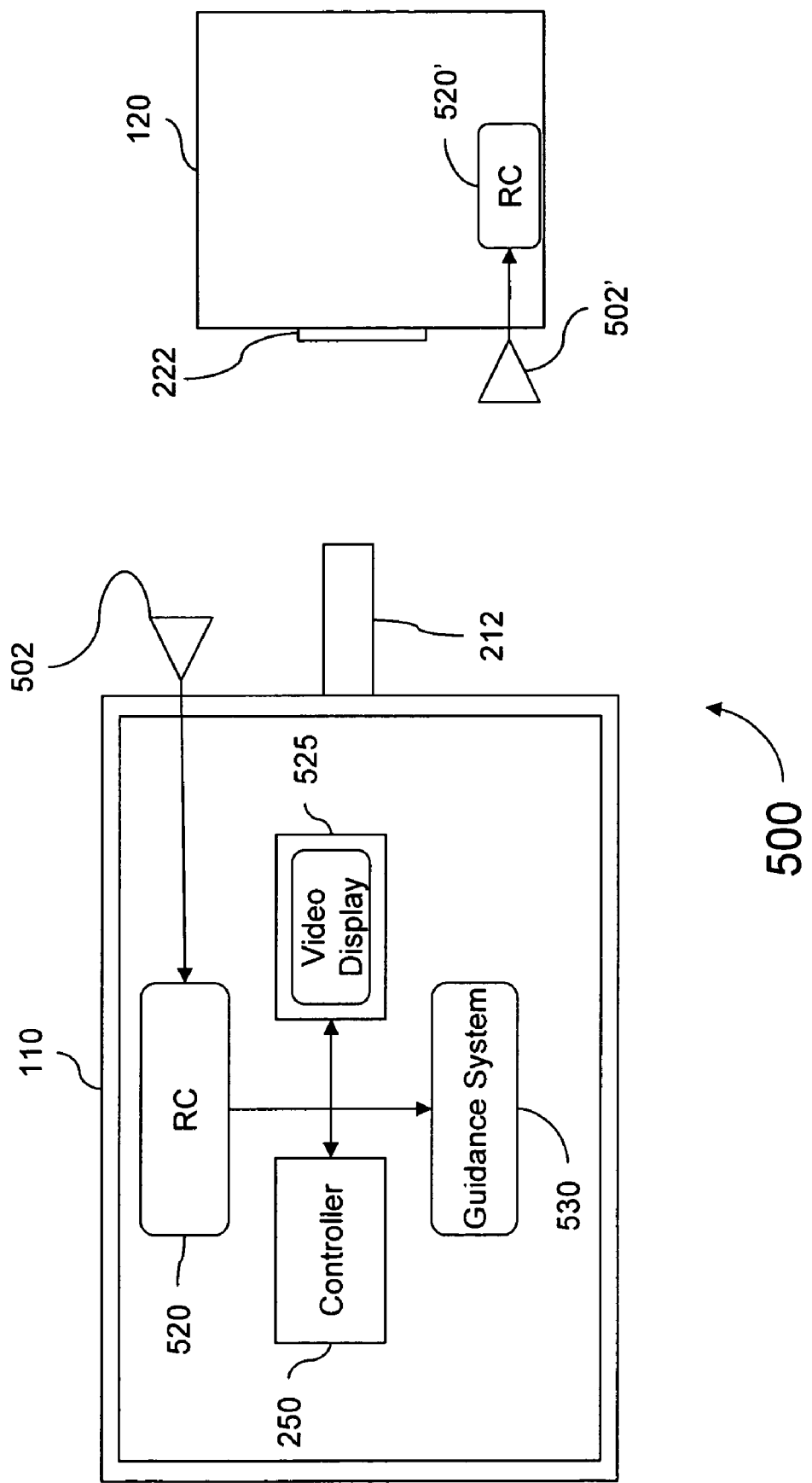
FIGS. 5A and 5B illustrates automated spacecraft assembly systems of embodiments of the present invention.

FIG. 5A illustrates an automated docking system 500 of one embodiment of the present invention. In one embodiment, first spacecraft module 110 includes an optical sensor module 502, adapted to output a serial digital video signal of video imagery of second spacecraft module 120. In one embodiment, first spacecraft module 110 further comprises a reconfigurable computer (RC) 520, configured to processes images captured by optical sensor module 502 to determine the relative positions of spacecraft modules 110 and 120 as described in the '6851 Application herein incorporated by reference. In one embodiment, RC 520 is further configured to implement a first digital filter adapted to remove from the serial digital video signal data pertaining to one or more of color, sound, and control symbols and to implement one or more memories adapted to store the serial digital video signal filtered by the first digital filter, as a memory mapped image as described in the '6851 Application herein incorporated by reference.

In one embodiment, RC 520 is further adapted to output one or both of video imagery of second spacecraft module 120 and the relative positions of spacecraft modules 110 and 120 to a human operator. In one embodiment, RC 520 is adapted to provide output via video display 525. The human operator then maneuvers spacecraft module 110 based on the output of RC 520 and operates controller 250, as described above, to fuse bonding posts 212 to receiving plates 222.

In one embodiment, a guidance system 530 is adapted to input one or more relative position signals from RC 520 and maneuver spacecraft module 110 based on the relative position signals in order to align bonding posts 212 with receiving plates 222. In one embodiment, when bonding posts 212 are within sufficient proximity with receiving plates 222, RC 520 is adapted to provide one or more output signals to controller 250 to fuse bonding posts 212 to receiving plates 222 as described above. Additional details pertaining to RC 520 and guidance system 530 are provided in the '6851 Application herein incorporated by reference.

In one embodiment, an optical sensor module 502' may be optionally located on second spacecraft module 120 and adapted to output a serial digital video signal of video imagery of first spacecraft module 110. In one embodiment an RC 520' coupled to optical sensor module 502' is also optionally located on second spacecraft module 120 and adapted to determine the relative positions of spacecraft modules 110 and 120, as described with respect to RC 520 above, based on the image captured by optical sensor module 502'. One skilled in the art upon reading this specification would appreciate that the information regarding the relative positions of spacecraft modules 110 and 120 may be communicated from spacecraft module 120 to spacecraft module 110 by a variety of currently available means such as, but not limited to, radio communications. In one embodiment, in operation, guidance system 530 is adapted to maneuver spacecraft module 110 to align bonding posts 212 with receiving plates 222 based on the relative position indicated by the video imagery of first spacecraft module 110 received from optical sensor module 502' on second spacecraft module 120. By maneuvering its own position based on images of itself in this way (i.e. as opposed to images of second spacecraft module 120), first spacecraft module 110 is automatically capable of automatically docking with a variety of differently shaped modules which may comprise second spacecraft module 120.

In contrast to other docking systems in the art, embodiments of the present invention assemble spacecraft modules into larger assemblies by fusing components of the modules together, rather than simply linking them through a system of mechanical latches. The bonds created by embodiments of the present invention are described as semi-permanent because embodiments of the present invention also provide methods and systems for separating spacecraft modules fused together as described above. In one embodiment, controller 250 is adapted to close switching devices 247 and adjust power source 242 to allow sufficient electrical current to flow through circuit 260 to produce molten metal between bonding posts 212 and receiving plates 222 to destroy electro-weld 245. As would be appreciated by one skilled in the art upon reading this specification, the amperage and time required to destroy electro-weld 245 may differ from those required to fuse bonding posts 212 and receiving plates 222 together.

Figure 3A:
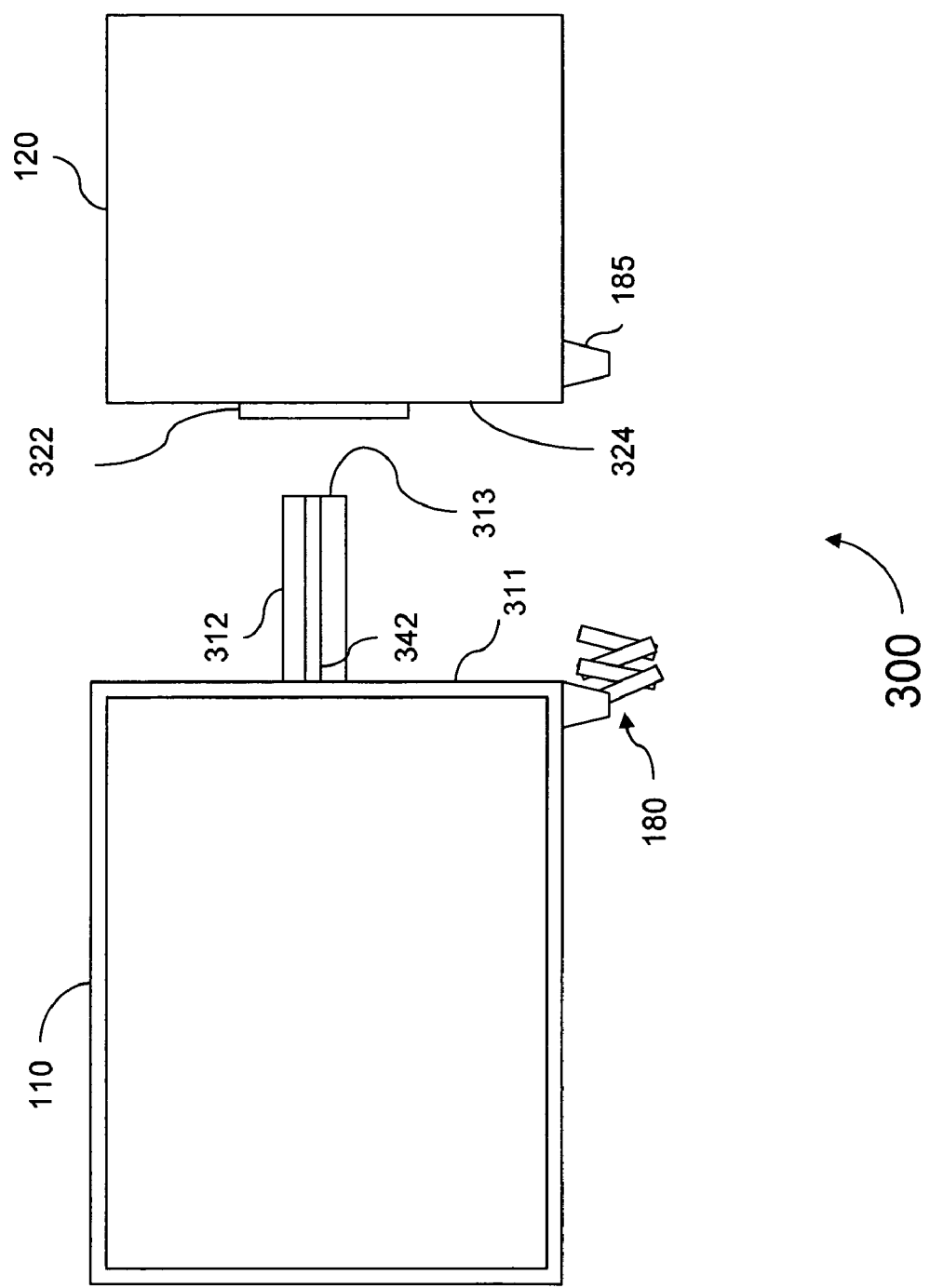
FIGS. 3A, 3B and 3C are illustrations of two spacecraft modules fused together by an adhesive bond of one embodiment of the present invention.
Figure 3B:
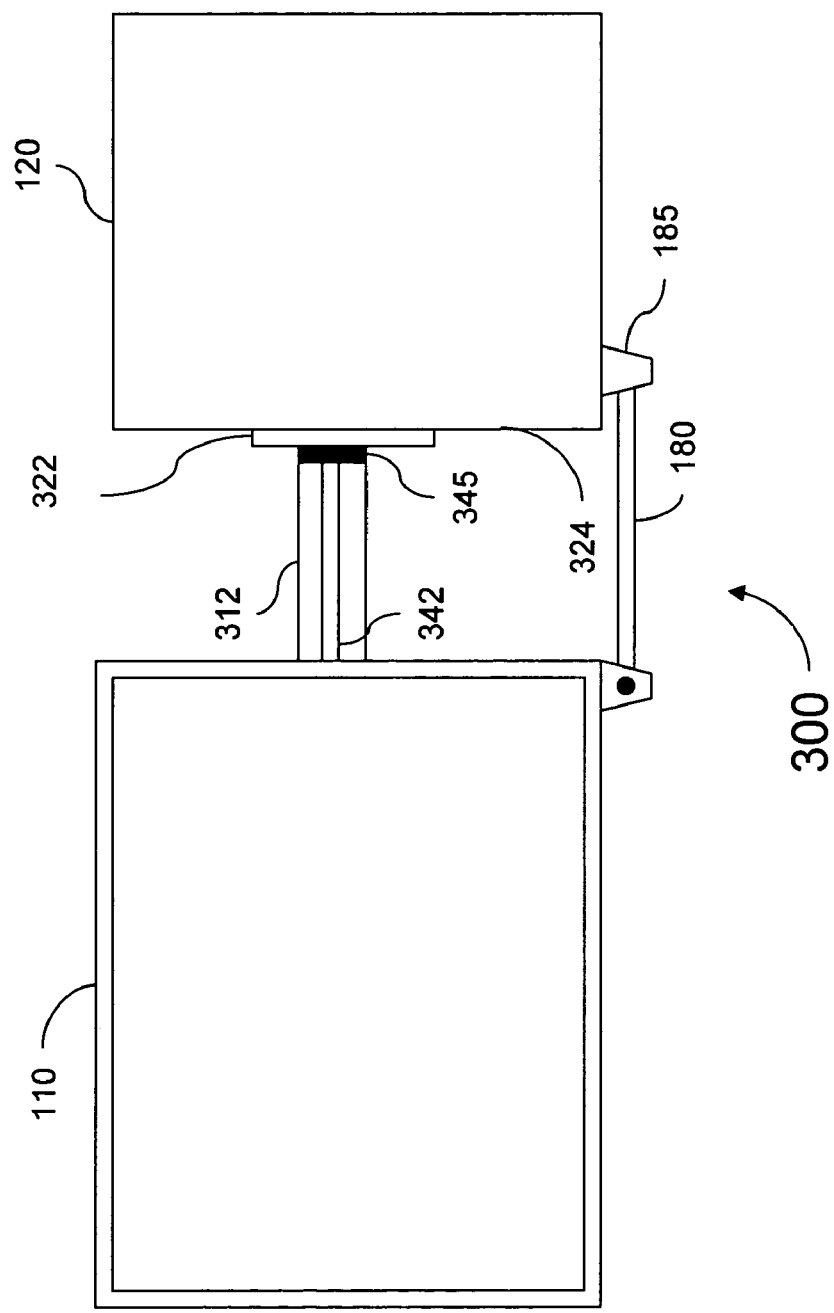

Illustrated in FIGS. 3A and 3B, in one embodiment 300, spacecraft modules 110 and 120 (shown separated in FIG. 3A) are fused to each other by an adhesive bond formed between bonding post 312 and receiving plate 322 (as shown in FIG. 3B). In one embodiment, first spacecraft module 110 comprises one or more bonding posts 312 mounted to an exterior surface 311 of spacecraft module 110. Spacecraft module 120 comprises one or more receiving plates 322 mounted to an exterior surface 324 of second spacecraft module 120. In space, one or both of spacecraft modules 110 and 120 are maneuvered to bring each of the one or more binding posts 312 into very close proximity, or in contact with one or the one or more metallic receiving plates 322. Spacecraft modules 110 and 120 are then adapted to fuse bonding posts 312 to receiving plates 322. Bonding posts 312 and receiving plates 322 are fused together by one or more bonding agents 343 such as, but not limited to CA glues, quick dry epoxy, heated plastic or heated waxes. Bonding agents 343 fuse bonding posts 312 to receiving plates 322 to form bond 345.

The choice of materials used in fabricating bonding posts 312 and receiving plates 322, and the type and amount of bonding agents 343 to use, are readily determined by one skilled in the art after reading this specification, based on the required strength of bond 345.

Figure 3C:
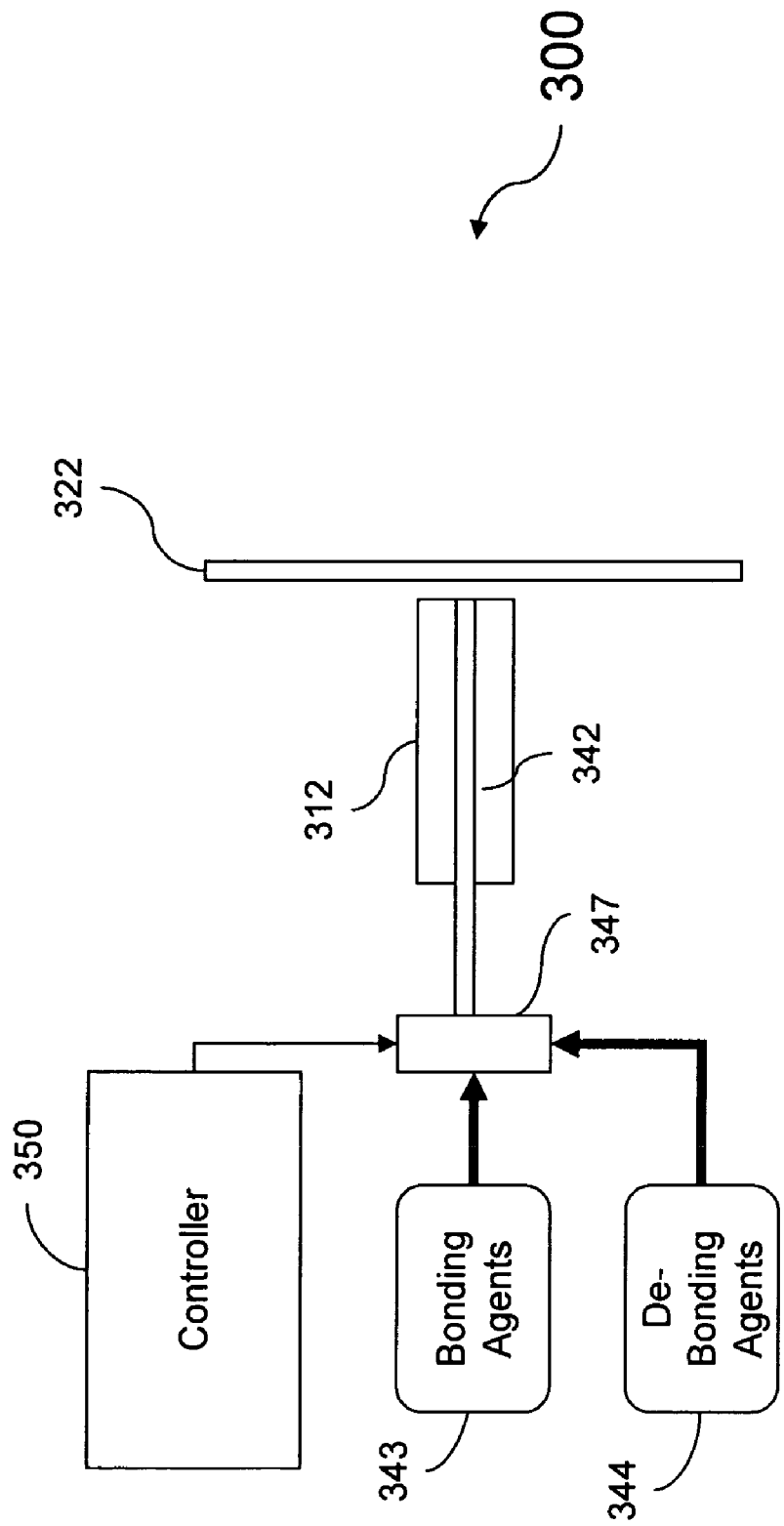

As illustrated in FIG. 3C, in one embodiment, system 300 further comprises a controller 350 adapted to control the flow of bonding agents to the interfacing surface area of bonding posts 312 and receiving plates 322. In one embodiment, one or more conduits 342 transverse bonding post 312 and provide one or more bonding agents 343 to bonding surface 313 of bonding post 312.

In one embodiment, controller 350 is adapted to switch on and off the flow of bonding agents 343 to bonding surface 313 by one or more flow control devices 347. In one embodiment, flow control devices 343 comprise one or more of valves and pumps. As spacecraft modules 110 and 120 are maneuvered together to bring bonding posts 312 and receiving plates 322 within sufficient proximity, controller 350 adjusts the flow of bonding agents 343 to bonding surface 313. When enough of bonding agents 343 is delivered, controller 350 cuts off the flow, allowing bonding agent 353 to solidify, thus fusing bonding posts 312 and receiving plates 322 together.

The surface area of receiving plate 322 must be large enough to accommodate bonding posts 312. Accordingly, the precision required for maneuvering the two spacecraft module together is a function of the surface area of receiving plates 322. The larger the surface area, the less precision alignment is needed to align bonding posts 312 with receiving plates 322. For the reasons described above regarding FIGS. 2A and 2B, once spacecraft modules 110 and 120 are fused together, precision connection of any auxiliary service conduits is more easily accomplished.

Figure 5B:
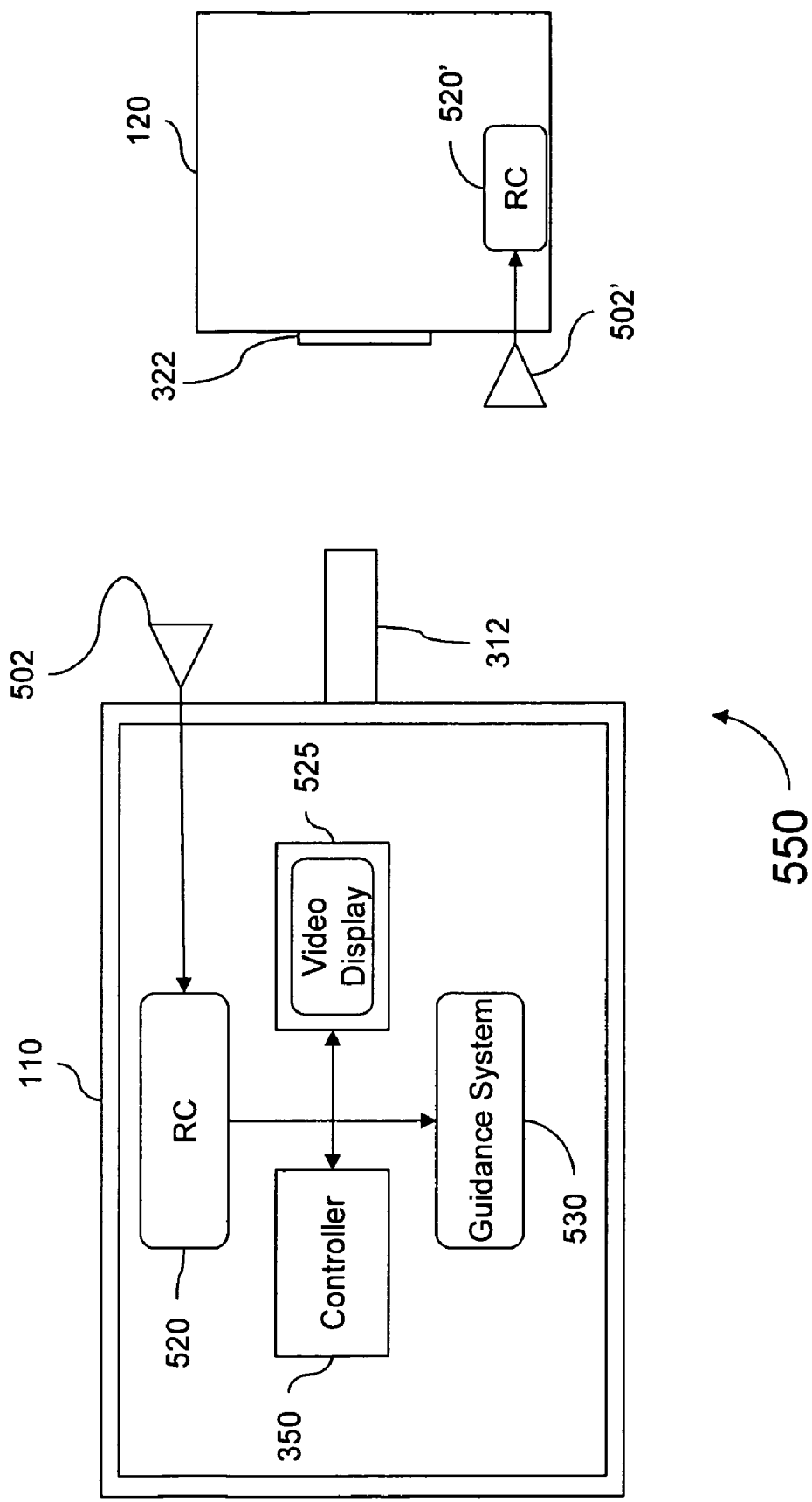

As previously described with respect to FIGS. 2A, 2B and 2C, the low level of precision required to maneuver spacecraft to practice embodiments of the present invention also reduces the need for on board resources necessary to perform a precision alignment and open the door for automated docking systems. In one embodiment, controller 350 is adapted to control the flow of bonding agents 343 based on input from a human operator. In another embodiment 550, controller 350 is adapted to control the flow of bonding agents 343 based on input from an automated docking system as illustrated in FIG. 5B. In one embodiment, controller 350 is adapted to receive one or more output signals from RC 520. Guidance system 530 is adapted to input one or more relative position signals from RC 520 and maneuver spacecraft module 110 based on the relative position signals in order to align bonding posts 312 with receiving plates 322. When bonding posts 312 are within sufficient proximity with receiving plates 322, RC 520 is adapted to provide one or more output signals to controller 350 to adhesively bond the bonding posts 312 to receiving plates 322 as described above. Additional details pertaining to RC 520 and guidance system 530 are provided in the '6851 Application herein incorporated by reference.

Embodiments of the present invention also provide methods and systems for separating spacecraft modules fused together by bonding agents 343 as described above. Referring to FIG. 3C, adhesive bonds 345 are dissolved by applying one or more de-bonding agents 344. In one embodiment, controller 350 is adapted to control the flow of de-bonding agents 344 to bonding surface 313 of bonding post 312.

Figure 4:
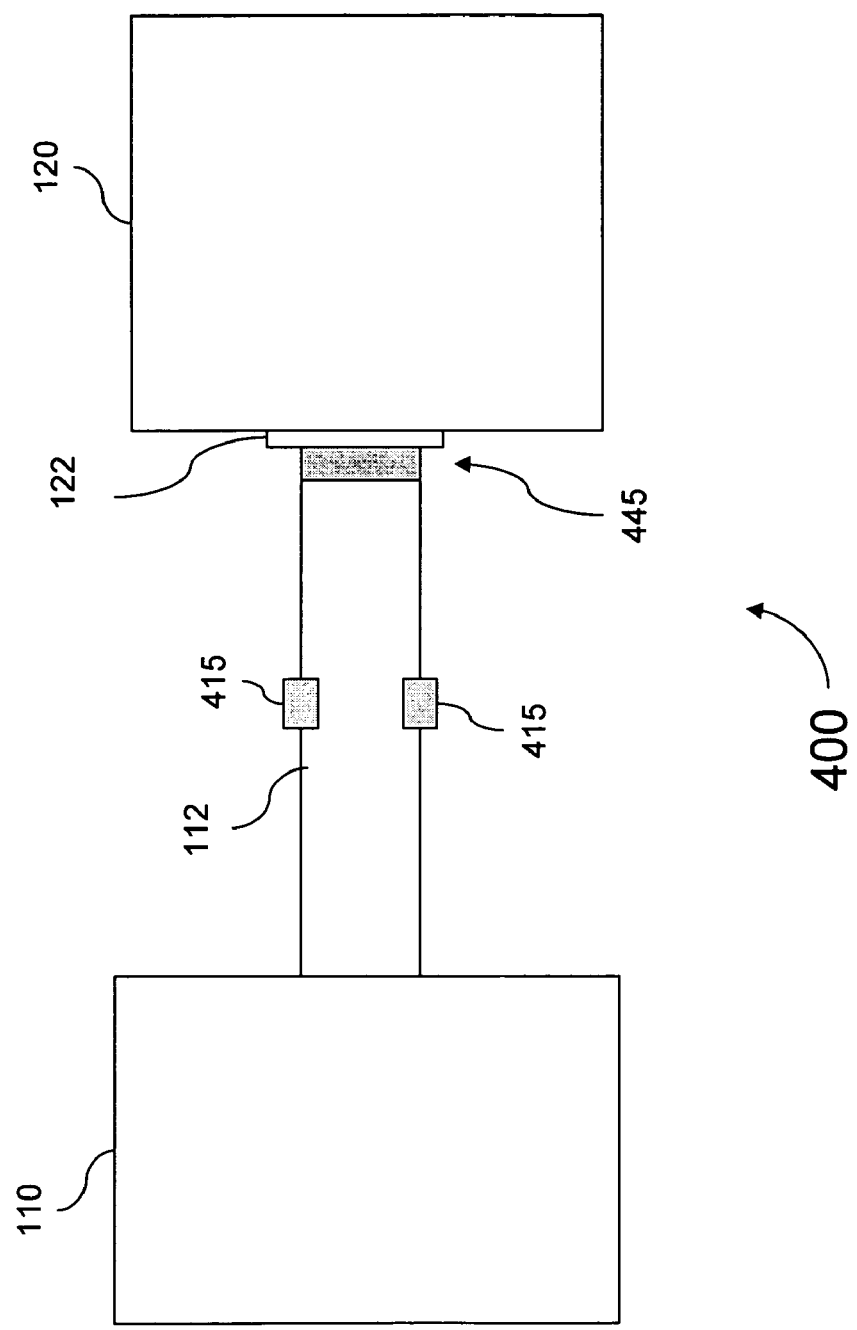
FIG. 4 illustrates a disassembly system of one embodiment of the present invention.

FIG. 4 illustrates an alternative embodiment for separating spacecraft modules 110 and 120 assembled with a bond 445 created by any of the above embodiments, In one embodiment, all or part of binding post 112 is destroyed using pyrotechnics. In one embodiment, binding post 112 is adapted with pyrotechnic devices 415 that sever a portion of binding post 112 from spacecraft module 110 in order to decouple spacecraft modules 110 and 120. In one embodiment, binding post 112 is adapted allow the remaining part of binding post 112 still secured to spacecraft module 110 to be reused to form another semi-permanent bond as described in this specification.

Figure 6:
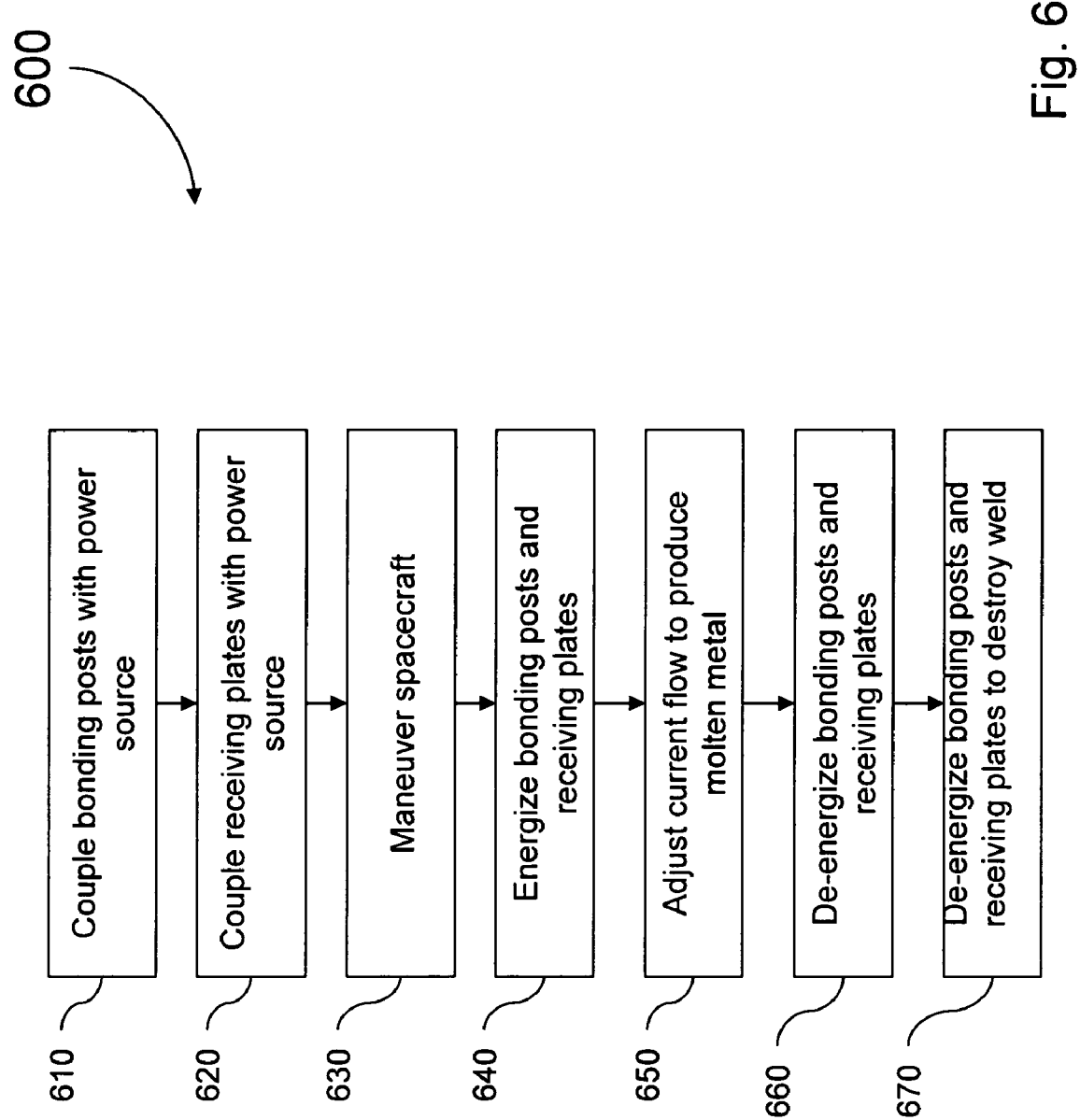
FIG. 6 is a flow chart illustrating a method of one embodiment of the present invention.

FIG. 6 provides a flow chart illustrating one method 600 for assembling spacecraft modules of one embodiment of the present invention. Method 600 provides a method for fusing two or more spacecraft modules together though one or more electro-weld bonds. The method comprises electrically coupling one or more bonding posts mounted on a first spacecraft module with an electrical power source (610). The method further comprises electrically coupling one or more receiving plates mounted on a second spacecraft module to the electrical power source (620). The bonding posts and receiving plates are coupled to opposite poles of the power source so that, when any intervening switches are closed, an electrical circuit is formed when the bonding posts come in contact with the receiving plates. In one embodiment, coupling the one or more receiving plates to the electrical power source is accomplished by maneuvering the spacecraft modules together until one or more externally mounted conductors, each coupled to the electrical power source, come into contact with the receiving plates. The two spacecraft are also maneuvered so that the one or more bonding posts are in contact with, or close proximity to the receiving plates. (630). The method then proceeds with electrically energizing the one or more bonding posts and receiving plates (640) by closing any intervening switches and adjusting the current flow to create molten metal where bonding posts and receiving plates interface (650) with each other. The bonding posts and receiving plates are de-energized when sufficient molten metal is produced (660). When heat from the current flow dissipates, the molten metal solidifies thus welding the first and second spacecraft modules together. As previously discussed, the magnitude of electric current required to produce the molten metal is readily determined by one skilled in the art of welding after reading this specification based on the characteristics of metals comprising the bonding posts and receiving plates. To then disassemble the modules from each other, the method continues with electrically re-energizing the one or more bonding posts and receiving plates (670) with sufficient current flow to destroy the weld. As would be appreciated by one skilled in the art upon reading this specification, the amperage and time required to destroy the weld may differ from the amperage and time required to fuse the bonding posts to the receiving plates.

FIG. 7 provides a flow chart illustrating one method 700 for assembling spacecraft modules of one embodiment of the present invention. Method 700 provides a method for fusing two or more spacecraft modules together though one or more adhesive bonds. The method comprises maneuvering spacecraft modules together so that bonding posts and receiving plates are in contact, or close proximity (710). To create the adhesive bond, method 800 comprises delivering one or more bonding agents to a bonding surface of the bonding posts (720). Bonding posts and receiving plates are pushed together (730) so that bonding agents delivered to the bonding surface of the one or more bonding posts adhere to the receiving plates until the bonding posts and receiving plates are fused together by the bonding agents. One skilled in the art would appreciate that the duration of time required to for the bonding agents to set will vary as a function of the bonding agents used and may select which bonding agents to use based partially on the setting time required. To subsequently disassemble the spacecraft modules from each other, the method continues with delivering one or more de-bonding agents to the bonding surface of the bonding posts (740) and dissolving the adhesive bond with the de-bonding agents (750).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for assembling two or more spacecraft modules together though one or more electro-weld bonds, the method comprising:
   maneuvering one or both of a first spacecraft module and a second spacecraft module in space so that one or more bonding posts are in close proximity to one or more receiving plates to form an electro-weld bond;
   receiving a proximity indication signal from an automated docking system, and automatically welding one or more bonding posts to one or more receiving plates based on the proximity indication signal,
   wherein said welding comprises:
   electrically energizing the one or more bonding posts and one or more receiving plates;
   adjusting current flow to create molten metal between the one or more bonding posts and the one or more receiving plates; and
   de-energized the one or more bonding posts and one or more receiving plates when sufficient molten metal is produced.

2. The method of claim 1, further comprising:
   connecting one or more auxiliary service conduits between the two or more spacecraft modules after securing the two or more spacecraft modules together by creating between the two or more spacecraft modules one or more electro-weld bonds.

3. The method of claim 1, further comprising:

electrically re-energizing the one or more bonding posts and one or more receiving plates with sufficient current flow to destroy the weld.

4. The method of claim 1, further comprising:

receiving one or more signals from the automated docking system and electrically re-energizing the one or more bonding posts and one or more receiving plates with sufficient current flow to destroy the weld, based on the one or more signals.

\* \* \* \* \*

UNITED STATES PATENT AND TRADEMARK OFFICE
CERTIFICATE OF CORRECTION

| | | |
|---|---|---|
| PATENT NO. | : 7,374,134 B2 | Page 1 of 1 |
| APPLICATION NO. | : 11/215570 | |
| DATED | : May 20, 2008 | |
| INVENTOR(S) | : Gordon L. Collyer et al. | |

It is certified that error appears in the above-identified patent and that said Letters Patent is hereby corrected as shown below:

Col. 8 line 45-65

Please replace the text of claim 1 with following text:

1. A method for assembling two or more spacecraft modules together though one or more electro-weld bonds, the method comprising:

maneuvering one or both of a first spacecraft module and a second spacecraft module in space so that one or more bonding posts are close enough to one or more receiving plates to form an electro-weld bond;

receiving a proximity indication signal from an automated docking system and automatically welding one or more bonding posts to one or more receiving plates based on the proximity indication signal, wherein said welding comprises:

electrically energizing the one or more bonding posts and one or more receiving plates;

adjusting current flow to create molten metal between the one or more bonding posts and the one or more receiving plates; and de-energizing the one or more bonding posts and one or more receiving plates when sufficient molten metal is produced.

Signed and Sealed this

Ninth Day of September, 2008

JON W. DUDAS
*Director of the United States Patent and Trademark Office*